Aug. 14, 1945.  A. B. NESBITT ET AL  2,382,020
CUTTING-OFF TOOL
Filed Nov. 10, 1943  5 Sheets-Sheet 1

Inventors:
ANDREW B. NESBITT and
SAMUEL WEBB,
by John E. Jackson
their Attorney.

Aug. 14, 1945.　　A. B. NESBITT ET AL　　2,382,020
CUTTING-OFF TOOL
Filed Nov. 10, 1943　　5 Sheets-Sheet 2

Inventors:
ANDREW B. NESBITT and
SAMUEL WEBB,
by John E. Jackson
their Attorney.

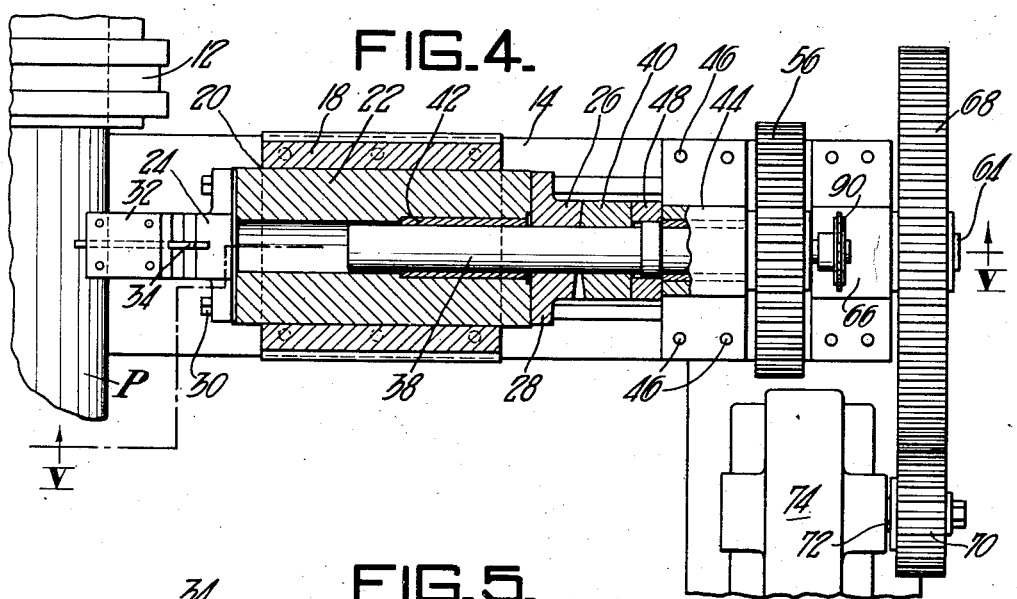
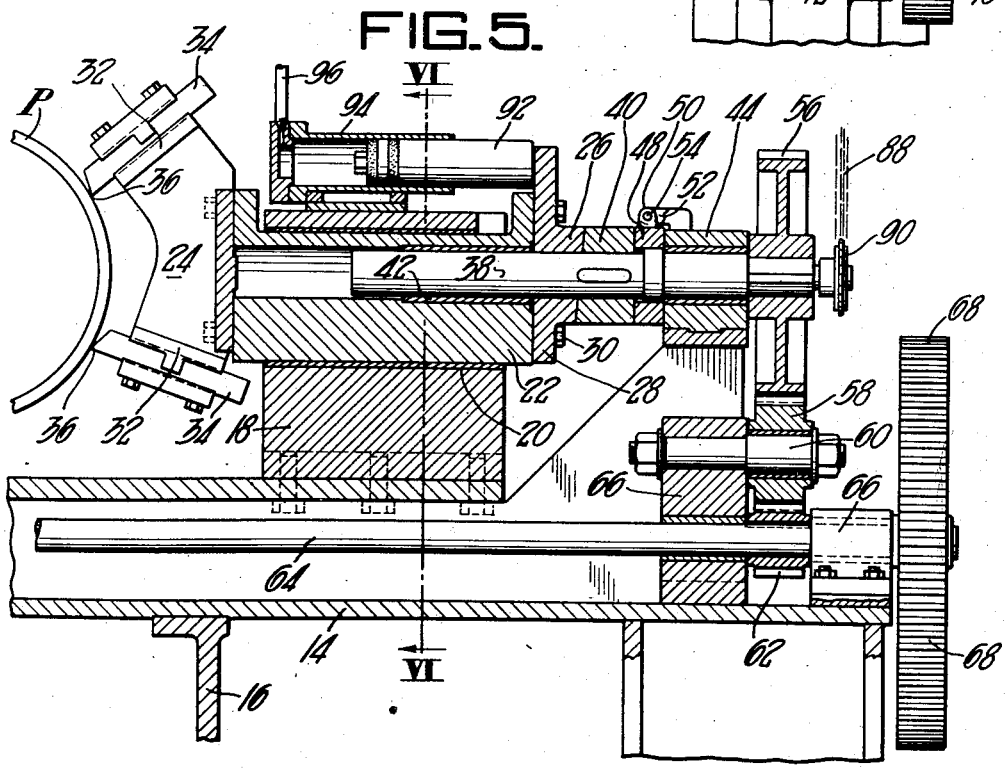

Aug. 14, 1945.    A. B. NESBITT ET AL    2,382,020
CUTTING-OFF TOOL
Filed Nov. 10, 1943    5 Sheets-Sheet 5
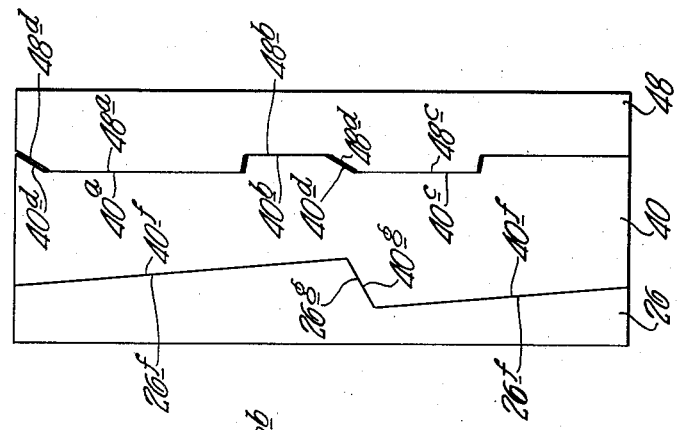
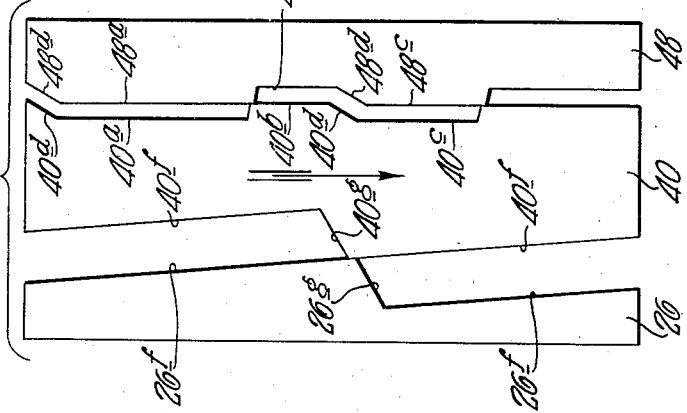
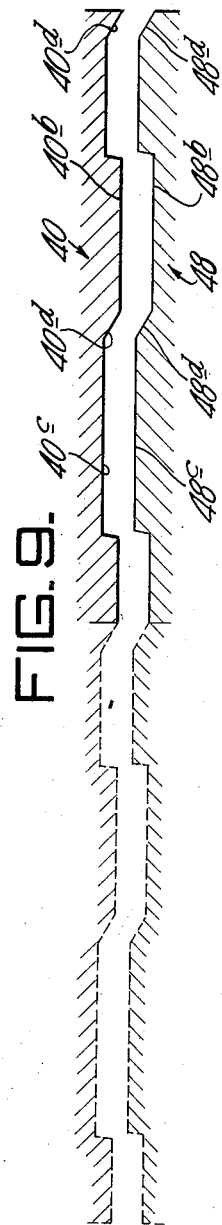
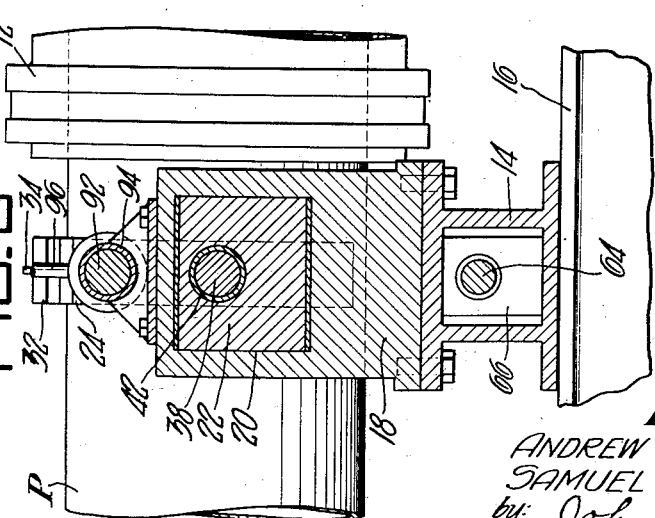
Inventors:
ANDREW B. NESBITT and
SAMUEL WEBB,
by: John E. Jackson
their Attorney.

Patented Aug. 14, 1945

2,382,020

UNITED STATES PATENT OFFICE 2,382,020

CUTTING-OFF TOOL

Andrew B. Nesbitt and Samuel Webb, Pittsburgh, Pa., assignors to National Tube Company, a corporation of New Jersey Application November 10, 1943, Serial No. 509,810

8 Claims. (Cl. 164—36)

The present invention relates to improvements in machine tools of the class for severing crop ends from elongated bar or pipe stock, or for cutting mill-length bars or pipes into short sections. The invention is particularly directed to the novel construction and arrangement of parts for mounting and operating the cutter tool in the specific manner more fully hereinafter described, illustrated, and claimed.

For a complete understanding of the invention, reference should be made to the following detailed description, the accompanying drawings, and the appended claims.

In the drawings, which illustrate a preferred embodiment of the invention:

Figure 4 is an enlarged horizontal section of the head shown at the right in Figure 1.

Figure 5 is a vertical section on line V—V of Figure 4.

Figure 6 is a detail transverse vertical section taken on line VI—VI of Figure 5.

Figure 7 is a diagram showing developments of a rotary cam and two complementary non-rotary cams coacting therewith.

Figure 8 is a view showing developments of the same cams shown in Figure 7, illustrating the relative positions of the parts after the rotating cam has moved to a position to cause a withdrawal of the cutters.

Figure 9 is a diagrammatic development view illustrating the coaction of the rotating cam and one of the non-rotating cams, the development of the non-rotating cam being repeated for illustrative purposes.

Figure 1:
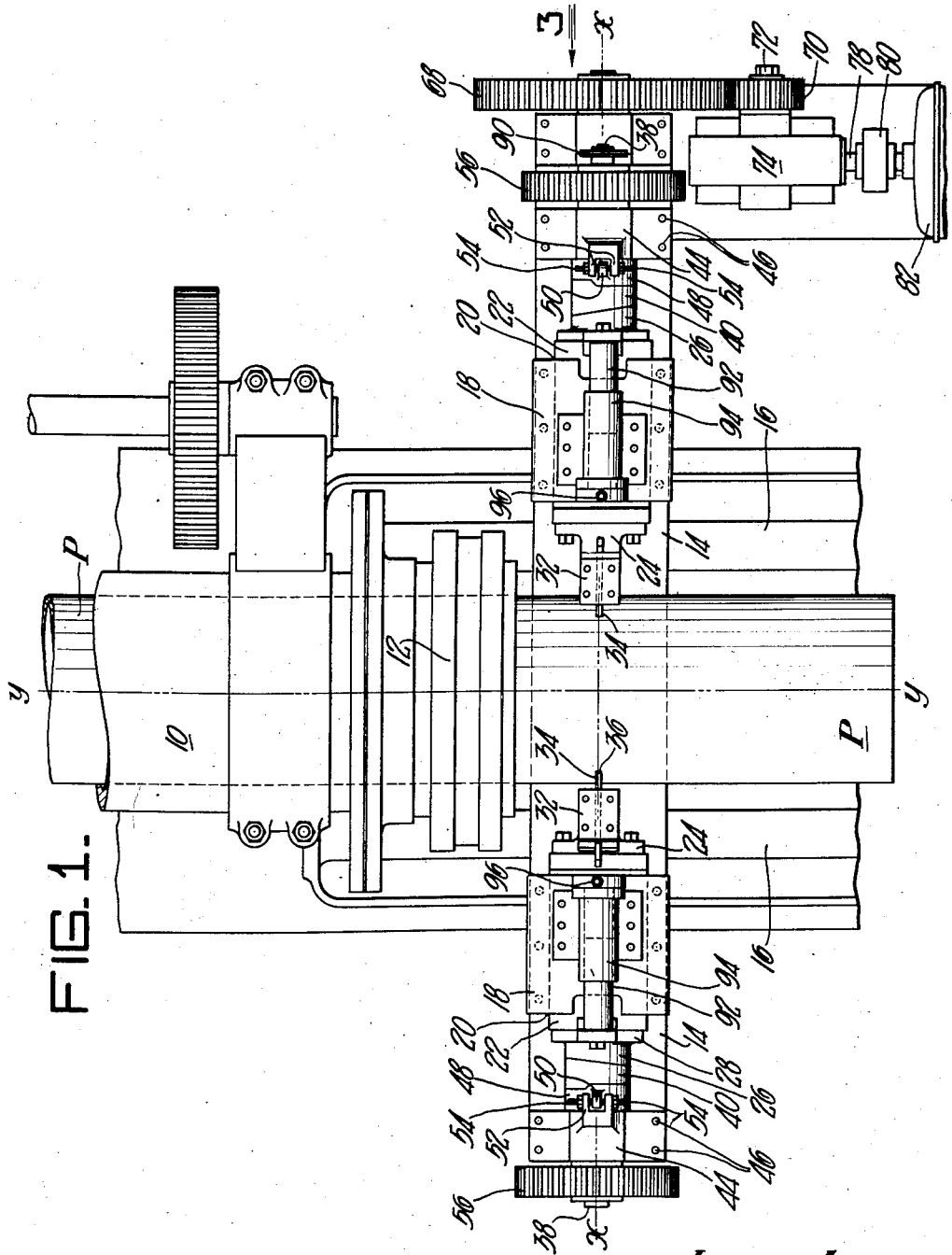
Figure 1 is a top plan view.
Figure 2:
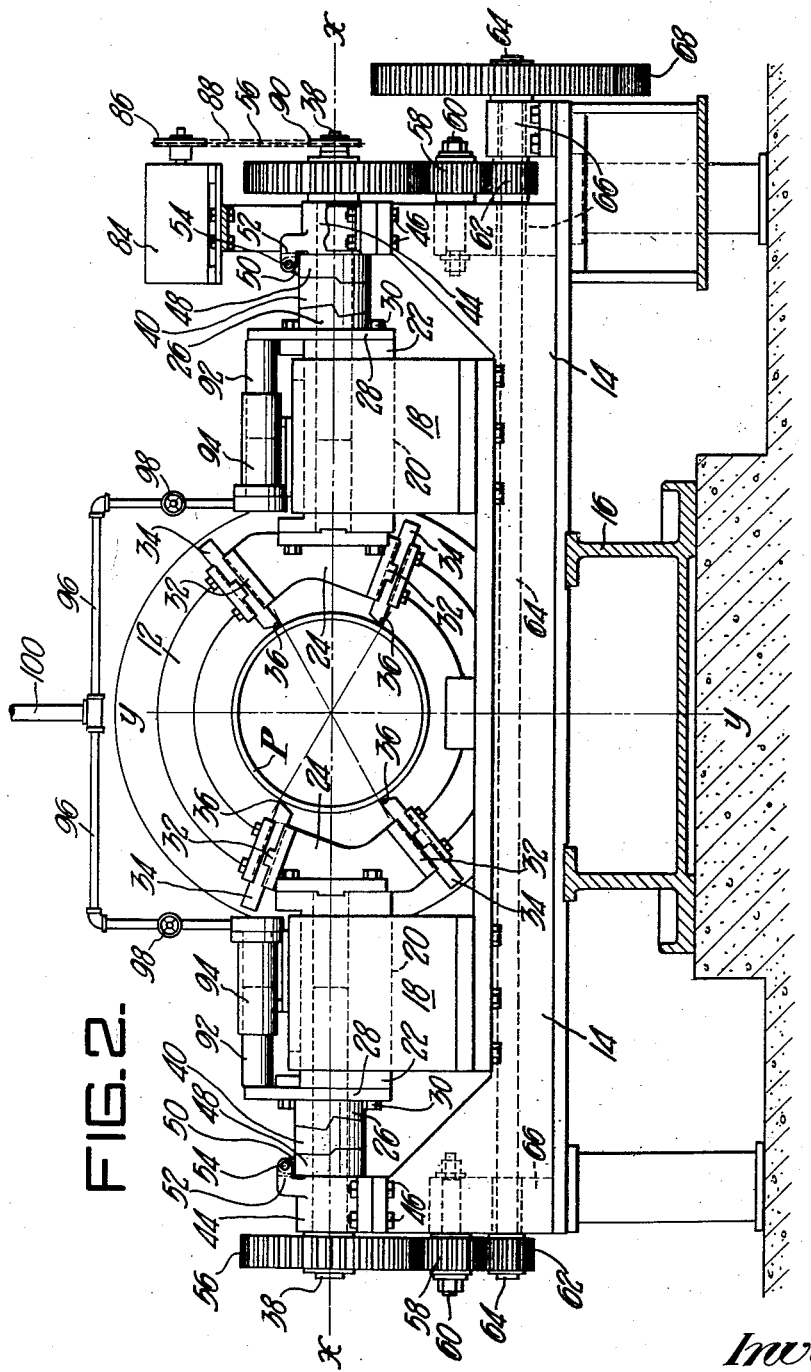
Figure 2 is an elevation viewed from the direction of arrow 2 in Figure 1.
Figure 3:
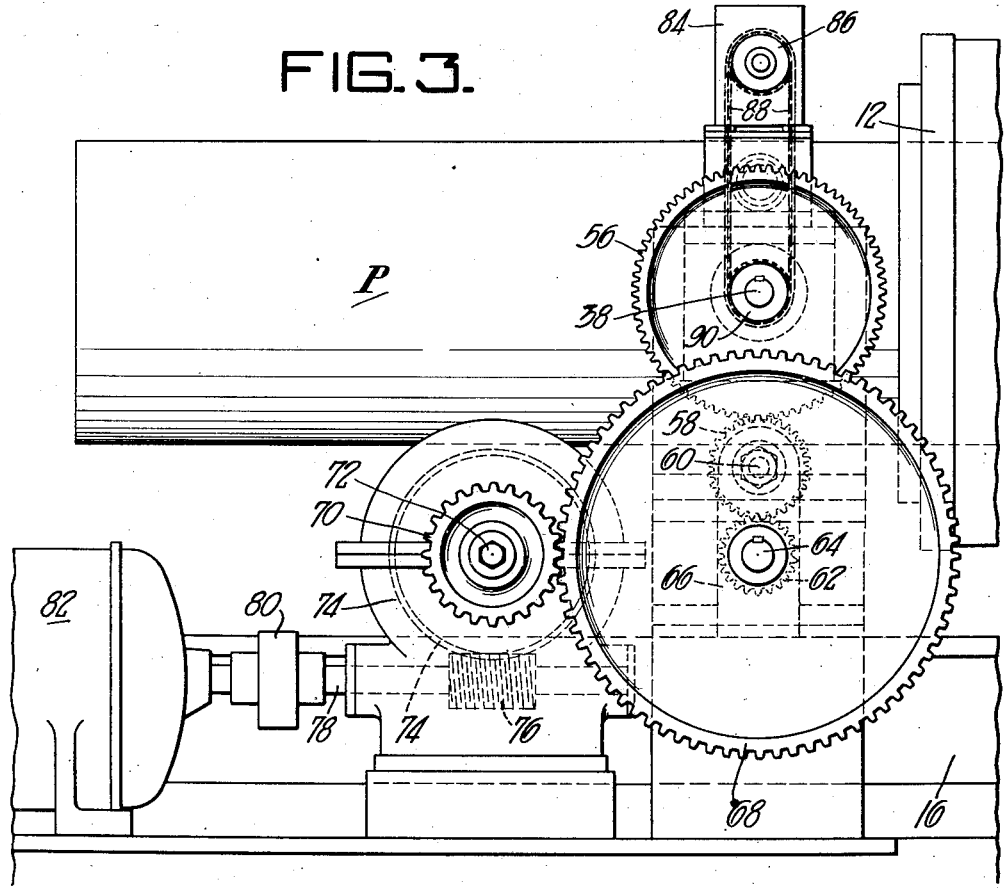
Figure 3 is an elevation viewed in the direction of arrow 3 of Figure 1.

As hereinafter more fully set forth, the improved machine embodying the present invention comprises conventional means for gripping bar or pipe stock and rotatably supporting it about its horizontal axis, with improved means for supporting a plurality of cutters simultaneously engageable with the stock on opposite sides of its longitudinal axis, the cutters being carried by heads secured to rams slidably supported for movement transversely of the stock, said rams being moved along lines transverse to the axis of the tube stock, the line of action of the rams passing through the axis of rotation of the stock, each ram being actuated by a respective set of rotating and non-rotating cams having active end faces of such contour that the tool head and cutters carried thereby is caused to initially make a rapid approach from its retracted to its cutting position, and to then make a slower feed, the arrangement being such that one or more portions of the rotating cams are always in firm face-to-face coaction with the surfaces of two of the non-rotating cams.

Referring in detail to the embodiment of the invention illustrated, 10 represents a conventional form of motor-driven spindle having a clutch controlled cam-operated chuck 12 adapted to grip the stock such as a length of bar or pipe indicated at P. Since the work-rotating spindle and chuck carried thereby are of conventional form, they will not be further illustrated or described.

Extending transversely of the axis of the pipe or bar P is a main supporting bed 14 mounted on a plurality of standards 16 anchored to a suitable foundation. Bolted or otherwise rigidly secured to the bed 14 on opposite sides of the axis of the stock P are identical fixed bearings 18—18 having guide cavities 20—20 of rectangular or non-circular form, for slidingly supporting rams 22—22 which carry tool heads 24 at their inner ends and non-rotatable cams 26 at their outer ends, the cams having flanges 28 which are secured by bolts 30 to the rams as shown. Each tool head carries a plurality of holders 32 so mounted on the tool head that they support respective cutters 34 in such positions that the cutting edges 36 engage the stock P at equally spaced points symmetrical about the horizontal center line X—X which passes through the axis of rotation Y—Y of the stock to be cut. Cam shafts 38 carrying rotatable cams 40 are supported at their inner ends in bearings 42 secured to and moving with the rams 22, and at their outer ends in fixed bearings 44 secured by bolts 46 to upstanding pedestal portions near the outer extremities of the bed 14. Located between each rotating cam 40 and each bearing 44 is a non-rotating cam 48 having an ear 50 extending between lugs 52 formed on the bearing 44, these lugs carrying adjusting screws 54 adapted to permit limited angular adjustment of the cam 48.

The outer face 40ª of each cam 40 is of undulated form with projecting portions 40ᵇ, recessed portions 40ᶜ, and inclined portions 40ᵈ, of the contour shown by the development of Figure 7. The non-rotating cam 48 is similarly undulated with complementary coacting portions 48ª, 48ᵇ, 48ᶜ, and 48ᵈ. As shown in Figure 8, these complementary portions of cams 40 and 48 are coincident when the cutters occupy the fully retracted position, in which the forward end of the cutter coincides with the line M of Figure 10.

Figure 10:
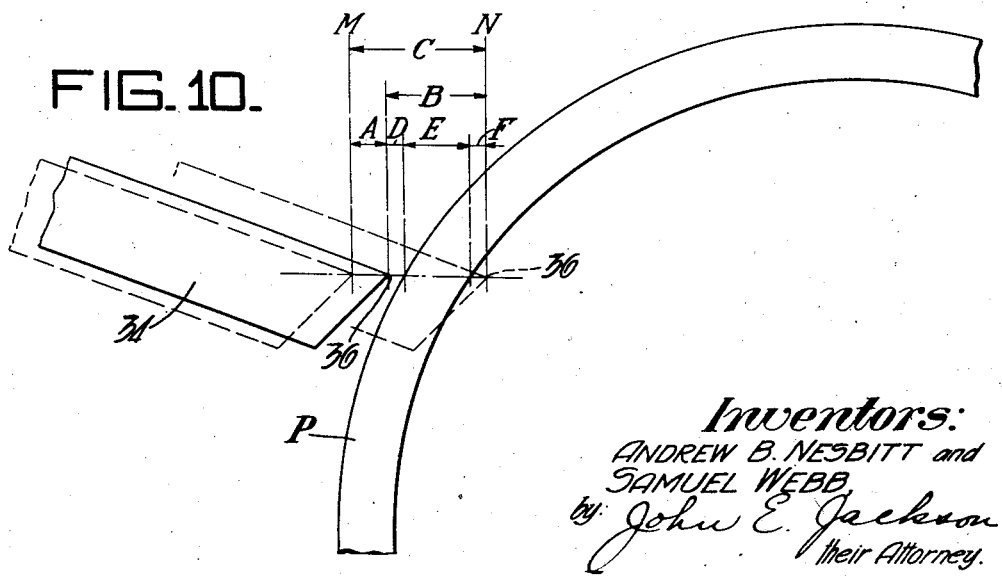
Figure 10 is an enlarged sectional view showing a cutter in full lines in a position just clear of the stock to be severed, and in dotted lines the respective fully retracted and the fully advanced positions which the cutter assumes.

The inner face of the cam 40 is formed with inclined active portions 40ᶠ, with an abrupt shoulder 40ᵍ between them. The non-rotating cam 26 is formed with complementary portions 26ᶠ and an abrupt shoulder 26ᵍ. When the cutting edges of the tools are retracted to their outermost position, indicated by vertical line M in Figure 10, the portions 40ᶠ and 40ᵍ will be coincident with the portions 26ᶠ and 26ᵍ of the cam 26, as shown in Figure 8. Upon rotation of the cam 40, the inclined portions 40ᵈ riding on similarly inclined portions 48ᵈ of the non-rotating cam 48, will quickly move the cutting edges 36 of the cutters from the position indicated by vertical line M of Figure 10 through the distance indicated by dimension A. This will leave a clearance, indicated by D, between the cutting edge of the cutter and the periphery of the tube stock. As the cam 40 continues its rotation, the faces 40ᶠ coacting with the complementary faces 26ᶠ of the non-rotating cam 26, will cause the cutting edge to slowly and powerfully move through the distance indicated by dimension B in Figure 10, to a point in alignment with the vertical line N, thus severing the wall of the stock as illustrated. The actual cutting part of this stroke is indicated in Figure 10 by the vertical lines between the arrowheads of the dimension line E. The lost motion indicated by dimension D provides for proper working clearance of the cutter. The clearance indicated at F represents the slight excess of movement after completion of the cut. These distances may of course be varied by making corresponding variations in the cam contour to suit the work to be done.

For the purpose of illustrating the action of the cam-actuated feed for the cutters, the development of non-rotating cam 48 has been repeated in Figure 9. If the cam 40, indicated at the top of the figure, is assumed to be shifted to the left, it will be apparent that the inclined portions 40ᵈ will initially ride up on the inclined portions 48ᵈ of the cam 48, and the projecting portions 40ᵇ will take bearing on the dwell portions 48ᶜ, the contour and proportions of the cams in development being such that during most of the time there are two large area surfaces 40ᵇ firmly and squarely seated on complementary portions 48ᶜ of the non-rotating cam, thus providing a firm bearing of generous area to counteract the cutting forces. At the same time, the inclined faces 40ᶠ of the rotating cam make a firm face-to-face engagement over a large area with the like inclined faces 26ᶠ of the non-rotating cam 26. After the cam 40 has turned through a sufficient angle to complete the movement at the cutting edge of the cutter from vertical line M to vertical line N in Figure 10, the complementary portions of the cams 40, 26 and 48 will come into substantial registry, as indicated by the development in Figure 8, whereupon the coacting cams may be said to be collapsed so as to thus permit retraction of the cutters to the position indicated by vertical line M in Figure 10.

When the cams 40 reach the position illustrated in Figure 8, the rams and cutters carried thereby are retracted by a hydraulic plunger 92 operating in a cylinder 94 supplied with fluid by pipe 96 under control of respective valves 98 connected with a suitable source of fluid pressure by the supply pipe 100 leading to an air reservoir not shown.

The cam feed of the cutters on opposite sides of the axis of rotation of the pipe or bar P, is synchronized in such a way that the symmetrically arranged cutters on one side of the axis of the work approach the latter in one direction and those on the opposite side of the axis approach from the opposite direction. This simultaneous cutting action at symmetrically spaced points is desirable since it distributes the cutting load and eliminates the turning movement present in prior art cut-off devices tending to overturn conventional tool carriages. Thus the importance of having the line of action $x$—$x$ of the cutter heads and cams intersect the axis of rotation $y$—$y$ of of the bar or pipe stock as shown and described, should be aparent.

The synchronization of movement of the cams on opposite sides of the work is attained by equipping each cam shaft 38 with a gear 56 which meshes with an idler 58 mounted on a fixed stud 60 and meshing with a pinion 62 secured to a shaft 64 mounted in bearings 66. At one extremity, the shaft 64 carries a gear 68 meshing with the pinion 70 secured to a shaft 72 of a reduction unit carrying a worm gear 74 meshing with a worm 76 mounted on a shaft 78 connected by a suitable flexible coupling 80 with a drive motor 82. As thus arranged, it is apparent that upon energization of the motor the cams 40—40 on opposite sides of the work will simultaneously cause the rams, tool heads, and cutters carried thereby to simultaneously approach and recede from the work, the rapid approach being caused by the inclined portions 40ᵈ and 48ᵈ of cams 40 and 48, and the feeding movement into the work at a relatively slower rate being caused by the portions 40ᶠ and 26ᶠ of the cams 40 and 26. The acceleration or deceleration during the cutting cycle is under control of the operator by manipulation of a suitable rheostat connected with the motor 82. A limit switch 84 of conventional form is provided to automatically cut off the supply of current to the motor upon completion of the cut, this limit switch being equipped with a sprocket wheel 86 which is connected by a chain 88 with a sprocket wheel 90 secured to one extremity of the right-hand cam shaft 38 shown in Figure 5.

A machine constructed and arranged as herein shown and described possesses inherent advantages over the usual or conventional types of cut-off machines heretofore available. It is considered important to have the bearings 18 for the rams rigidly positioned on the base in such a way that there is no movement of one relative to the other. This is in contrast to conventional cut-off machines, which usually have gibs or slideways at this point and a movable carriage carrying a tool holder slidable on the ways. Such prior construction has the disadvantage that fine cuttings gravitate to the surface, resulting in premature wear thereof, which soon impairs the functioning of the machine. The herein claimed machine effectively overcomes this inherent disadvantage in conventional cutting machines.

A further feature of advantage of the machine herein described over prior constructions, is that in the machine of the present invention the power is applied directly to the ram by means of the novel cam arrangements in a line perpendicular to the axis of rotation of the work with the cutters symmetrically arranged on opposite sides of the work, thus balancing the cutting forces ad eliminating the turning moment which is present in conventional tool carriages which slide on ways located in a plane spaced a considerable distance from the plane of the axis of rotation of the work.

The synchronous action attained by simultaneously driving both cams on opposite sides of the work is also a feature of improvement over prior conventional practice, since it provides for a more positive mechanical means for applying power through the cams 40 than that available by the use of hydraulic pressure or fluid-actuated devices which usually require the use of somewhat complex equalizing bars and connections.

The illustrated symmetrical arrangement of the cutters is advantageous since it provides four cutting tools arranged around the periphery of the pipe so that their cutting edges contact the pipe at an angle of 30° symmetrically above and below a horizontal center line intersecting the axis of rotation of the stock and on both sides of the vertical center line intersecting said axis. A plurality of symmetrically arranged cutters is preferable to a single cutter, since it increases the over-all severing speed of the unit. The specifically illustrated arrangement is deemed advantageous since the cutters are arranged in two pairs, and one pair opposes the other pair. Thus the transverse thrust across the cutting zone is balanced, and the alignment of the pipe in the spindle and grippers is maintained more accurately than is the case in prior art constructions.

While we have described quite precisely the design and arrangement of a tool which an actual reduction to practice has demonstrated to possess great utility, it is to be understood that various modifications and substitutions of equivalents may be made by those skilled in the art without departure from the invention as defined in the appended claims.

We claim:

1. A machine tool for severing elongated bar or pipe stock, comprising means for rotating the stock on its longitudinal axis, a tool support carrying a cutter, one non-rotatable cam movable with said support, another non-rotatable cam retracting against a fixed abutment, a rotatable cam between the two said non-rotatable cams, and a shaft for said rotary cam whose axis of rotation is transverse to, and substantially or approximately in the same plane with, the axis of rotation of said stock, the opposite end faces of said rotary cam being undulated and the respective end faces of said two non-rotatable cams adjacent thereto being similarly undulated, whereby the turning motion of said rotary cam transmits a thrust to said tool support along a line substantially intersecting the axis of rotation of said stock.

2. A machine tool for severing elongated bar or pipe stock, comprising means for rotating the stock on its longitudinal axis, a tool support carrying a plurality of cutters spaced symmetrically with relation to the axis of the stock, one non-rotatable cam movable with said support, another non-rotatable cam retracting against a fixed abutment, a rotatable cam between the two said non-rotatable cams, and a shaft for said rotary cam whose axis is transverse to, and substantially in the same plane with, the axis of rotation of said stock, the opposite end faces of said rotary cam being undulated and the respective end faces of said two non-rotating cams adjacent thereto being similarly undulated, whereby the turning motion of said rotary cam transmits a thrust to said tool support along a line substantially intersecting the axis of rotation of said stock.

3. A machine tool for severing elongated bar or pipe stock, comprising means for rotating the stock on its longitudinal axis, respective rams carrying cutters engageable with the stock on opposite sides, means slidably supporting said rams for movement transversely of and approximately in the plane of said stock, a respective set of complementary rotating and non-rotating cams coacting with each ram, a respective cam shaft on which the rotating cam of each set is mounted, the axes of said shafts being perpendicular to and intersecting the axis of the stock rotating means, one non-rotating cam of each set being secured to one ram and the other non-rotating cam of each set reacting against a fixed abutment, and power transmission elements operatively connecting said cam shafts, whereby the rotary cams are both operated in unison so that in coaction with the non-rotating cams they are effective to simultaneously move the cutters on opposite sides of the longitudinal axis of the stock into cutting engagement therewith.

4. A machine tool for severing elongated bar or pipe stock, comprising means for rotating the stock on its longitudinal axis, respective rams each carrying a plurality of cutters engageable with opposite sides of the stock, means slidably supporting said rams for movement transversely of said stock, the plurality of cutters on each ram being symmetrically spaced and converging toward the axis of the stock, respective means for traversing each ram toward the stock, each traversing means comprising one non-rotating cam secured to the ram, another non-rotating cam engaging a fixed abutment, a rotatable cam having respective end cam faces coacting with abutting faces of both the non-rotatable cams, a respective shaft for each said rotatable cam, the axis of each shaft being substantially coincident with the longitudinal axis of the work, and means for driving both cam shafts in synchronism so as to cause the cutters on the respective rams to simultaneously approach said stock.

5. A machine tool for severing elongated bar or pipe stock, comprising means for rotating the stock on its longitudinal axis, a tool support carrying at least one cutter, a rotary cam exerting a thrust on said tool support along a line transverse to and approximately intersecting the longitudinal axis of rotation of said stock, a motor and power transmission elements operatively connecting it with said cam, a limit switch driven in synchronism with said cam, said switch controlling the power circuit to said motor, whereby upon completion of the cutting stroke of the cam the motor is stopped, and fluid pressure-operated means for retracting the cutter support after completion of the forward cutting movement of said cam.

6. A machine tool for severing elongated bar or pipe stock, comprising means for rotating the stock on its longitudinal axis, a tool support carrying at least one cutter, means for traversing the tool support toward the stock, said traversing means comprising one non-rotating cam secured to the tool support, another non-rotating cam engaging a fixed abutment, a rotatable cam disposed between the two non-rotary cams and having respective end cam faces coacting with abutting faces of both the non-rotating cams, and means for driving the rotatable cam.

7. A machine tool for severing elongated bar or pipe stock, comprising means for rotating the stock on its longitudinal axis, a ram carrying a cutter engageable with said stock, means slidably supporting the ram for movement transversely of the axis of said stock, a set of complementary rotating and non-rotating cams coacting with the ram effective to move the cutter toward the stock, and means for driving the rotatable cam.

8. A machine for severing elongated bar or pipe stock, comprising means for rotating the stock on its longitudinal axis, a tool support carrying at least one cutter, means for traversing the tool support toward the stock, said traversing means comprising one non-rotating cam secured to the tool support, another non-rotating cam engaging a fixed abutment, a rotatable cam disposed between the two non-rotating cams and having respective cam faces coacting with abutting faces of both the non-rotating cams, means for driving the rotatable cam, and means for retracting the cutter support upon completion of the forward cutting movement of said rotatable cam.

ANDREW B. NESBITT.
SAMUEL WEBB.